(12) United States Patent
Bechtler et al.

(10) Patent No.: US 9,823,268 B2
(45) Date of Patent: Nov. 21, 2017

(54) METHOD FOR CALIBRATING A SENSOR BUILT INTO A VEHICLE

(71) Applicant: Robert Bosch GmbH, Stuttgart (DE)

(72) Inventors: Henrik Bechtler, Bietigheim-Bissingen (DE); Marcus Wagner, Lauffen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 271 days.

(21) Appl. No.: 14/622,226

(22) Filed: Feb. 13, 2015

(65) Prior Publication Data

US 2015/0253352 A1    Sep. 10, 2015

(30) Foreign Application Priority Data

Mar. 4, 2014  (DE) .................. 10 2014 203 935

(51) Int. Cl.
*G01P 21/00*     (2006.01)

(52) U.S. Cl.
CPC ..................................... *G01P 21/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,589,015 | B2* | 11/2013 | Willis | G01C 21/165 701/1 |
| 2011/0153156 | A1* | 6/2011 | Haller | B60T 8/171 701/36 |
| 2012/0173081 | A1* | 7/2012 | Hsu | B62D 5/0457 701/42 |

* cited by examiner

*Primary Examiner* — Thomas G Black
*Assistant Examiner* — Ana Thomas
(74) *Attorney, Agent, or Firm* — Norton Rose Fulbright US LLP; Gerard Messina

(57) ABSTRACT

In a method for calibrating a sensor installed in a vehicle, a triggering signal for the calibration is automatically generated subsequent to the vehicle production process, during which calibration sensor signals are calibrated as a function of the inclination of the ground on which the vehicle is located.

11 Claims, 2 Drawing Sheets

METHOD FOR CALIBRATING A SENSOR BUILT INTO A VEHICLE

FIELD OF THE INVENTION

The present invention relates to a method for calibrating a sensor built into a vehicle.

BACKGROUND

It is known that one may obtain current data on vehicle state variables, such as the vehicle speed or the acceleration in the longitudinal direction and the transverse direction, via sensor systems in the vehicle. The vehicle state variables may be used in various assemblies and systems in the vehicle, for instance, in driver assistance systems and in driving safety systems, via which an automatic intervention may be made in the vehicle performance. Such a driving safety system is, for example, an electronic stability program (ESP), with the aid of which the vehicle is able to be stabilized.

An assumption for the orderly functioning of driver assistance systems and driving safety systems is a high signal quality of the measured data supplied by the sensor system. In this context, one should make sure that installation tolerances during the mounting of the sensor system in the vehicle do not lead to an inadmissible error.

SUMMARY

The present invention is based on the object of compensating for installation tolerances during the mounting of a sensor system in a vehicle using simple measures.

According to an example embodiment of the present invention, a method is used for the calibration of a sensor built into vehicles. The sensor is firmly connected to the vehicle and supplies sensor signals, particularly vehicle state variables, which can, if necessary, be processed further in a regulating or control unit in the vehicle. Based on such measured values as are supplied by the sensor, driver assistance systems and driving safety systems can be operated, for example, to automatically intervene in the driving state of the vehicle and make possible autonomous or partially autonomous driving. An example of a driver assistance system is a parking assistant, and examples of a driving safety system include an antilock system (ABS), an antislip control (ASC), or an electronic stability program (ESP).

The sensor is installed in the vehicle during the manufacturing process, and can have dependence on position, particularly in such a way that the sensor signals supplied depend on the angular position of the sensor in the vehicle. For instance, angular deviations in the installation position of the sensor about the vehicle's longitudinal axis or about the vehicle's transverse axis, even in the case of a level ground on which the vehicle is standing, can lead to a durable deviation (offset) in the acceleration signals of a longitudinal or a transverse acceleration sensor. Therefore, to avoid an erroneous sensor signal, either the sensor has to be installed in the vehicle with great precision or it has to be calibrated.

The method according to the present invention is based on the calibration of the sensor, an advantage of which being that position deviations of the sensor from an ideal setpoint position, for instance, based on installation tolerances, are detected via the calibration and are compensated. The calibration of the sensor takes place subsequently to the vehicle's manufacturing or production process, so that the calibrating step does not have to be integrated into the production process of the vehicle and therefore does not interfere with the production process.

The calibration takes place in an automatic way, by a triggering signal being generated automatically, subsequent to conclusion of the vehicle production process, the triggering signal starting the calibration process. The generation of the triggering signal can, in turn, depend on an event that characterizes the conclusion of the production process.

During the calibration process, a series of sensor signals is generated in the sensor, the signals being calibrated as a function of the inclination of the ground on which the vehicle is standing. Since the calibration is carried out at a specified point in time, the position of the vehicle, including the inclination of the ground on which the vehicle is located, during the calibration is known. An offset in the sensor signals results from the inclination of the ground, which is taken into account in the calibration. Regardless of the offset which originates from a possible ground inclination, an offset can be ascertained from the sensor signals that originate from deviations of the installation position from an ideal installation position. This offset is stored and can be taken into account, after the conclusion of the calibrating process, in the sensor signals generated by the sensor in running operation.

The calibration method can be carried out both on even ground and on an inclined ground. Both inclinations of the ground about the vehicle's longitudinal axis and about the vehicle's transverse axis can be taken into account. Even in calibration for compensating for oblique-angled installation positions of the sensor in the vehicle, angular deviations with respect to the vehicle longitudinal axis and/or with respect to the vehicle's transverse axis can be taken into account.

The calibration is advantageously carried out at a standstill of the vehicle. It is also possible, however, to perform the calibration during a motion of the vehicle, in this case, preferably the ground, on which the vehicle is moving, having no inclination or a constant one. In a calibration during a vehicle motion, the vehicle advantageously has a constant speed and preferably travels straight ahead.

According to a further example embodiment, the triggering signal for the beginning of the calibration process is generated during a start of the vehicle's motor, which is responsible or at least jointly responsible for the movement of the vehicle. The vehicle motor is, for example, an internal combustion engine, an electric motor, or a hybrid drive that includes a combination of an internal combustion engine and an electric motor.

The start of the motor represents the triggering signal or leads to the generation of a triggering signal, so as to carry out the calibration process. The calibration process can be connected to a specific starting process of the vehicle motor, which coincides with the end of the vehicle production process. Normally, the vehicle motor is started once or more than once during the vehicle production process, and the end of the production process is characterized by a certain starting process which follows several preceding starting processes. At this starting process, at which, for example, there follows a trip of the finished produced vehicle from a production system to a lot lying further out, the calibrating step is advantageously carried out, preferably during the standstill of the vehicle.

The triggering signal is preferably generated in a motor control unit of the vehicle, which initiates the starting processes of the vehicle motor. If, for example, the fifth starting process is characteristic for the end of the production process, at this starting process a triggering signal can be generated for calibrating the sensor.

An example of the sensor is an acceleration sensor, preferably for ascertaining longitudinal accelerations and/or transverse accelerations in the vehicle. This sensor can be a part of an inertial sensor system, which is integrated into the hydraulic unit of an electronic stability program (ESP).

The method is implemented in processing circuitry, e.g., of a regulation or control unit in the vehicle. The regulation or control unit can be a motor control unit.

Further advantages and expedient embodiments may be gathered from the claims, the description of the figures, and the drawings.

DETAILED DESCRIPTION

Figure 1:
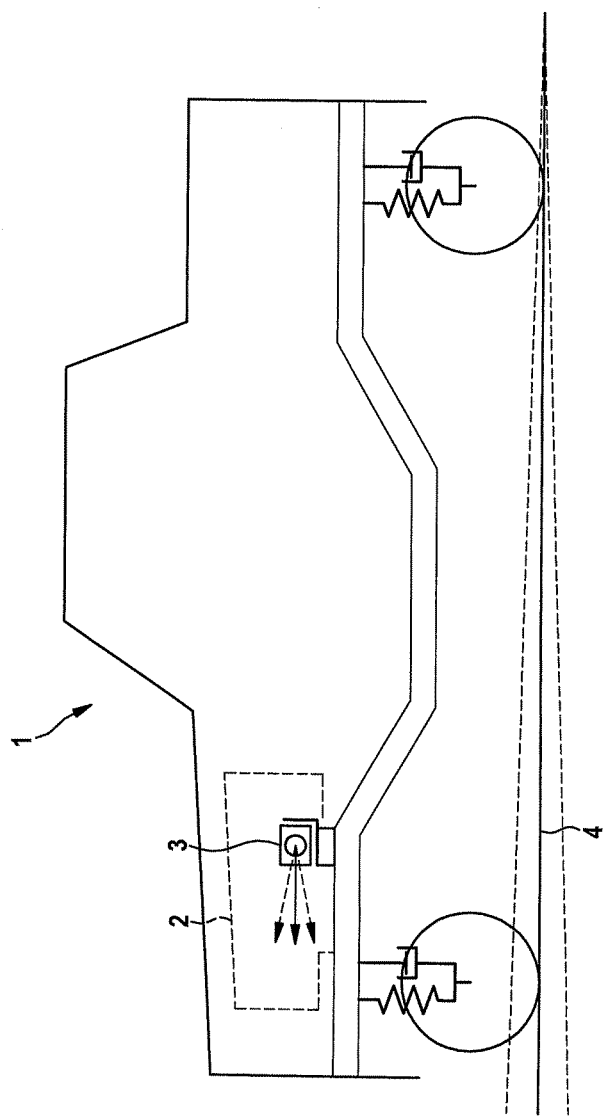
FIG. 1 in a schematic representation of a vehicle that includes an installed acceleration sensor, according to an example embodiment of the present invention.

FIG. 1 shows a vehicle 1 equipped with a vehicle motor 2, for example, an internal combustion engine, and with a sensor 3, for example, an acceleration sensor for ascertaining the vehicle's longitudinal acceleration and/or the vehicle's transverse acceleration. Sensor 3 can be a part of an inertial sensor system integrated into an hydraulic unit of an electronic stability program (ESP).

Sensor 3 supplies acceleration signals, whose value depends on the inclination of the ground 4 on which the vehicle is located. Depending on the inclination of ground 4, shown by dashed lines, sensor 3 supplies different acceleration signals, according to the arrows entered in the figure. Installation tolerances, which lead to an angular deviation of the sensor with respect to the vehicle's longitudinal axis and transverse axis, influence the acceleration signals and lead to a signal offset, which is detected with the aid of a calibration process, so that the offset is able to be compensated for in running operation.

Figure 2:
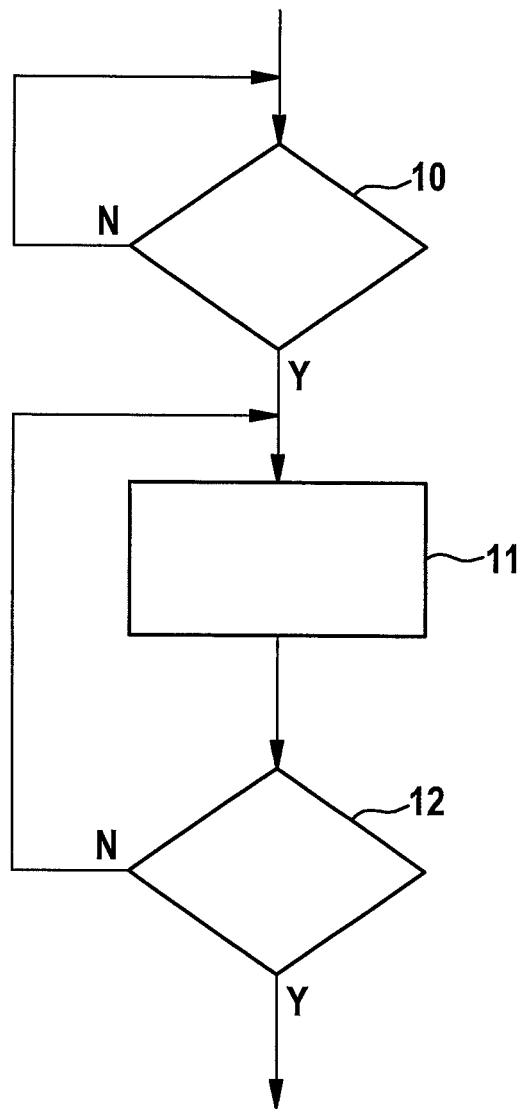
FIG. 2 is a flowchart that illustrates a method for calibrating the sensor signals of the sensor, according to an example embodiment of the present invention.

FIG. 2 is a flowchart that illustrates a method for carrying out the calibration of the sensor. In order not to interfere with the production process of the vehicle, the calibration step is carried out after the conclusion of the vehicle's production process. This carrying out takes place automatically in that, under specified conditions, a series of sensor signals is generated at standstill of the vehicle and an offset is ascertained from the sensor signals, the offset being stored and subsequently added or subtracted from the sensor signals during normal driving operations. This procedure has the advantage that installation tolerances of the sensor in the vehicle can be taken into consideration so that no disproportionately high requirements on the installation tolerances are necessary.

In a first method step 10, it is first queried whether the vehicle production process has been concluded, and the conditions for a start of the calibration process are satisfied, in which case a triggering signal is generated for starting the calibration process. The beginning of the calibration process is coupled to the end of the vehicle production process and is established with the aid of a certain start of the vehicle's motor, which can be, for example, an internal combustion engine.

During the vehicle production process, the vehicle motor is usually started several times. After the conclusion of the production process, the finished vehicle has to be started and driven from the production system to a lot, this starting process being detectable in a motor control unit, whereupon a triggering signal is generated for the execution of the calibration process.

Accordingly, it is queried in method step 10 whether the specified starting process that characterizes the end of the production process is present. If this is not yet the case, the No branch ("N") is returned again to the beginning of method step 10, and this query is repeatedly carried out at cyclical intervals.

On the other hand, if the response to the query in step 10 is that the specified starting process is present, the Yes branch ("Y") is subsequently advanced to next method step 11, in which the calibration process is carried out. This takes place via a triggering signal generated in the motor control unit, whereupon a series of signals is generated in the sensor, from which an offset is ascertained. In the calibration process, the inclination of the ground, on which the vehicle is standing, can be taken into account, in order to exclude a corruption of the offset which originates with installation tolerances of the sensor.

In the following method step 12, additional conditions can be queried, at whose satisfaction the calibration process is ended. It is advantageous, for example, that the vehicle stand still during the calibration process. Accordingly, in step 12 it can be queried whether the vehicle speed is unequal to zero, where, if this is not the case, the vehicle is standing still and the No branch is subsequently be returned and the calibration process continued, and otherwise the Yes branch is correspondingly advanced and the calibration process is ended. As a further query in step 12, it can be taken into account whether a minimum number of sensor values has yet been generated which are to be taken into account in the calibration process. If this is not yet the case, then, as described above, following the No branch, the calibration process is continued in step 11, and otherwise the Yes branch is subsequently advanced and the calibration process is ended.

The ascertained offset, originating with the installation tolerances, is stored permanently, and can be taken into account in the running operation to correct the sensor signals.

What is claimed is:

1. A sensor calibration method comprising:
due to a pre-definition of an $N^{th}$ occurrence of a starting of a motor of a vehicle as a condition for triggering performance of a calibration of a sensor installed in the vehicle, responsive to the predefined $N^{th}$ occurrence of the starting of the motor of the vehicle, automatically beginning, by processing circuitry, a start of the calibration of the sensor installed in the vehicle, wherein the calibration:
includes determining values by which sensor signals of the sensor are to be modified due to an offset of an installed position of the sensor relative to a target position of the sensor; and
is performed as a function of an inclination of ground on which the vehicle is located.

2. The method of claim 1, wherein the motor is an internal combustion engine, an electric motor, or a hybrid drive that includes a combination of an internal combustion engine and an electric motor.

3. The method of claim 1, wherein the processing circuitry is a motor control unit of the vehicle.

4. The method of claim 1, wherein the sensor is an acceleration sensor.

5. The method of claim 4, wherein the sensor signals include signals that represent a longitudinal acceleration and a transverse acceleration.

6. The method of claim 5, wherein the acceleration sensor is part of an inertial sensor system, which is integrated into a hydraulic unit of an electronic stability program (ESP).

7. The method of claim 1, wherein the inclination, as a function of which the calibration is performed, includes an inclination of ground on which the vehicle is located about at least one of the vehicle longitudinal axis and the vehicle transverse axis.

8. A control unit comprising:
processing circuitry, wherein the processing circuitry is configured to automatically begin a start of a calibration of a sensor installed in a vehicle in response to a predefined $N^{th}$ occurrence of a starting of a motor of a vehicle due to a pre-definition of the $N^{th}$ occurrence of the starting of the motor of the vehicle as a condition for triggering the performance of the calibration, wherein the calibration:
includes determining values by which sensor signals of the sensor are to be modified due to an offset of an installed position of the sensor relative to a target position of the sensor; and
is performed as a function of an inclination of ground on which the vehicle is located.

9. A vehicle comprising:
a control unit that includes processing circuitry configured to automatically begin a start of a calibration of a sensor installed in a vehicle in response to a predefined $N^{th}$ occurrence of a starting of a motor of a vehicle due to a pre-definition of the $N^{th}$ occurrence of the starting of the motor of the vehicle as a condition for triggering the performance of the calibration, wherein the calibration:
includes obtaining at least one predefined measurement of an inclination of ground; and
as a function of each of the at least one predefined measurement of the inclination of ground, determining values by which sensor signals of the sensor are to be modified due to an offset of an installed position of the sensor relative to a target position of the sensor.

10. The vehicle of claim 9, wherein the at least one predefined measurement of the inclination of ground includes two predefined measurements of the inclination of ground, each used in association with a respective sensing performed by the sensor during the calibration.

11. The method of claim 1, wherein N is greater than 1.

* * * * *